Feb. 24, 1931.  L. H. MYERS  1,794,240
DEAD FALL TRAP
Filed Jan. 4, 1930
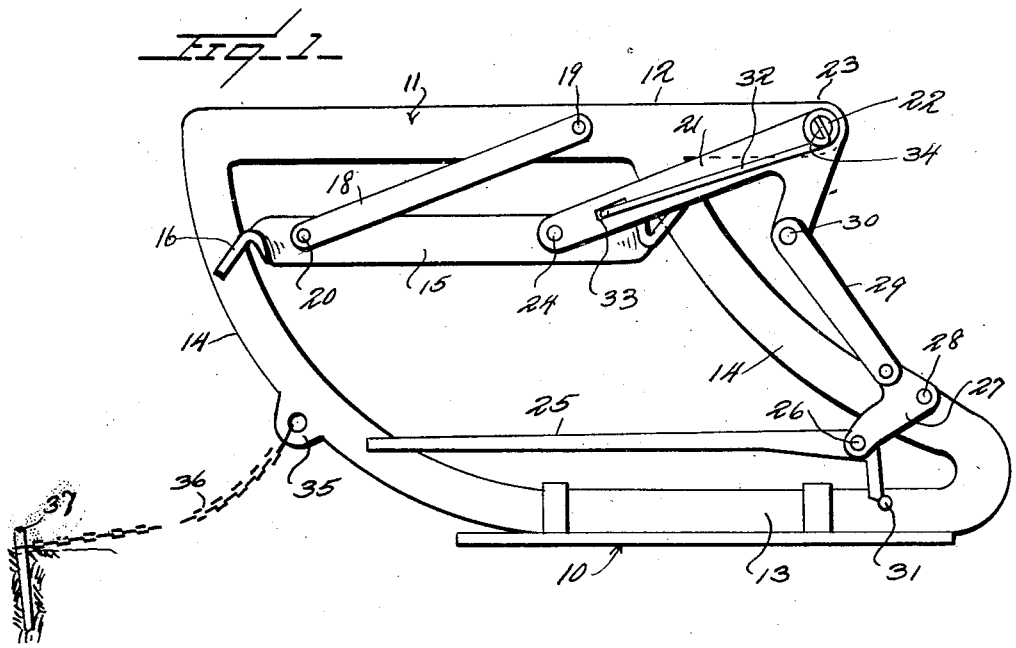
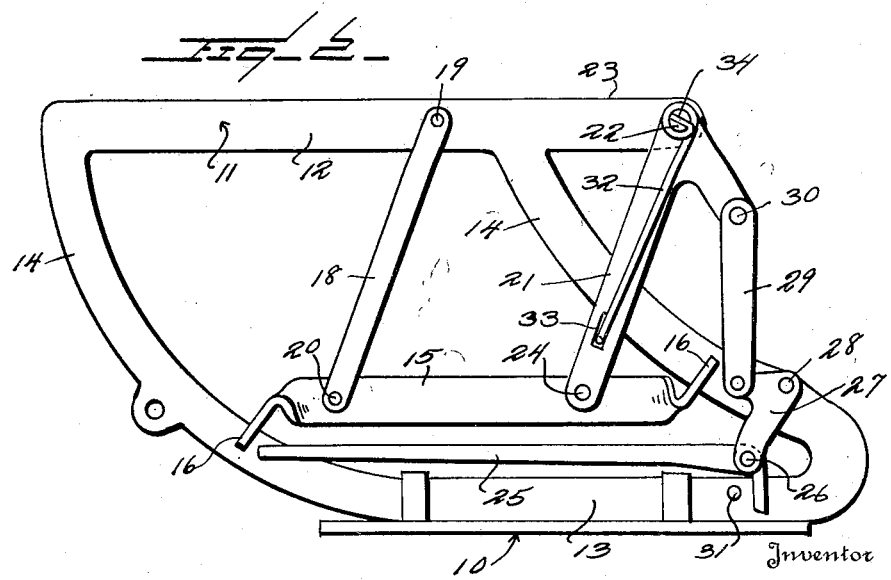
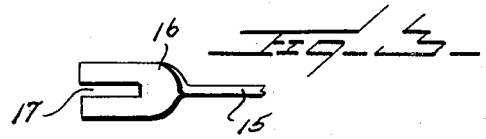
Inventor
L. H. Myers
By Watson E. Coleman
Attorney Patented Feb. 24, 1931

1,794,240

UNITED STATES PATENT OFFICE

LEONIDAS H. MYERS, OF SEYMOUR, INDIANA

DEADFALL TRAP

Application filed January 4, 1930. Serial No. 418,558.

The present invention relates to animal traps and more particularly to dead fall traps.

An object of this invention is to provide a dead fall trap which is adapted to kill the animal caught within the trap.

Another object of this invention is to provide a trap of this character wherein the movable jaw member is maintained in substantially parallel relation to the fixed jaw member.

A further object of this invention is to provide a device of this character having extremely sensitive tripping means so that the slightest touch will cause the trap to close.

The above and various other objects and advantages of this invention will in part be described in and in part be understood from the following detailed description of the present preferred embodiment, the same being illustrated in the accompanying drawing wherein:—

Figure 1 is a detail side elevation of a device constructed according to the preferred embodiment of this invention in open or set position;

Figure 2 is a detail side elevation of the device in closed position; and

Figure 3 is a fragmentary detail view of one of the guide members.

Referring to the drawing wherein like numerals of reference designate corresponding parts throughout the several views, the numeral 10 designates generally the base of the trap upon which is mounted a frame generally designated as 11. The frame 11 is provided with a pair of substantially parallel upper and lower members 12 and 13 respectively, and the parallel frame members 12 and 13 are connected together by a pair of arcuately inclined or segmental end members 14.

A movable jaw member or dead fall member 15 is slidably mounted within the frame 11 and is provided with guide members 16 at the opposite ends thereof which are adapted to engage the arcuately inclined end portions 14 of the frame. In the preferred embodiment of this invention, the guide members 16 are formed integrally with the dead fall member 15, the opposite ends of the member 15 being bent or twisted and provided with guide slots 17 which are adapted to loosely engage the end portions 14 of the frame.

A link member 18 is pivotally secured at one end to the upper frame member 12 as at 19 and is pivotally secured at 20 to the movable jaw member 15. A second link member 21 of substantially V construction is pivotally mounted on an outstanding shaft or pin 22 which is secured to the rearwardly extending portion 23 of the upper frame member 12. The lower end portion of the link member 21 is pivotally secured at 24 to the movable jaw member 15 and is positioned rearwardly of the link member 18 and is adapted to be mounted in substantially parallel relation thereto so as to maintain the movable jaw member 15 in substantially parallel relation to the lower jaw 13 during the movement of the movable jaw 15 downwardly.

A trip member or trigger 25 of substantially elongated construction is pivotally mounted at 26 on a plate member 27. The plate member 27 is pivotally secured at 28 to the frame member 14 spaced upwardly from the lower parallel frame member 13. A link member 29 is secured at one end to the plate 27 and at the opposite end pivotally secured to the V-shaped link 21 as at 30. The trigger 25 is of substantially L-shaped construction and is adapted to engage an outstanding pin member 31 which is adapted to hold the trigger 25 in set position.

A spring or resilient member 32 is mounted about the outstanding pin 22 and is adapted to have one end portion thereof extend downwardly so as to engage in a slot 33 adjacent the lower end portion of the link member 21. The opposite end of the spring 32 is mounted in a slot or opening 34 in the outstanding shaft 22. The resilient member or spring 32 is adapted to urge the movable jaw member 15 downwardly so that when the trigger 25 has been tripped, the movable jaw member 15 will be suddenly swung downwardly so as to strike the animal caught therebetween.

The forward arcuate member 14 is provided with an outstanding apertured lug 35 for receiving a flexible securing member 36. The flexible member 36 may be constructed of any suitable material but in the preferred embodiment is constructed of a chain or the like, the opposite end of the flexible member being securely held in the ground by a stake 37 or the like.

In the operation of this device, the movable jaw member 15 is adapted to be swung upwardly, and when the short leg portion of the trigger member 25 has been positioned on the trigger engaging member 31 the movable jaw 15 will be held in upstanding position. It is, of course, understood that the trigger member 25 is adapted to extend substantially the full length of the lower frame member 13 and when in set position is adapted to extend upwardly in substantially spaced relation to the lower frame member 13 so that when an animal passes thereover, the trigger will be forced downwardly thereby releasing the tension of the spring and permitting the jaw member 15 to be swung downwardly. While the frame 11 and the movable members may be constructed of metal, the trigger may be constructed of a combination of metal and wood, the pivoted end being made of metal and the free end made of wood.

It will, of course, be understood that various changes and modifications may be made in the details of construction and design of the above specifically described embodiment of the invention without departing from the spirit thereof, such changes and modifications being restricted only by the scope of the following claims.

What is claimed is:—

1. A dead fall trap of the character described comprising a base, a frame upstanding from said base, said frame comprising upper and lower parallel members, arcuately inclined end members secured to said parallel members, a movable jaw member swingingly carried by said frame, guide means carried by said movable jaw member for engaging said arcuate end portions, resilient means for urging said movable jaw member downwardly, and tripping means for said movable jaw.

2. A dead fall trap of the character described comprising a base, a frame mounted on said base, a movable jaw member swingingly carried by said frame, guide means carried by said movable jaw member and engaging said frame, resilient means for constantly urging said movable jaw member downwardly, and trigger means for holding said movable jaw member in upstanding open position.

3. A dead fall trap of the character described comprising a base, a frame upstanding from said base, said frame comprising upper and lower parallel members and arcuately inclined end members, a movable jaw mounted in said frame and adapted for movement between said upper and lower members, guide means carried by said movable jaw and engaging said arcuately inclined end portions, means for maintaining said movable jaw in parallel relation to said upper and lower members, resilient means for swinging said movable jaw downwardly, and trigger means for holding said jaw in upstanding position.

4. A dead fall trap of the character described comprising a base, a frame mounted on said base, said frame comprising upper and lower parallel members and arcuately inclined end members, a movable jaw mounted in said frame, guide means carried by said movable jaw and adapted to engage said frame, pivoted link members carried by said frame and engaging said movable jaw whereby to maintain said movable jaw in parallel relation to said upper and lower members, a plate pivotally mounted on said frame, trigger means pivotally carried by said plate, link means connecting said plate and one of said pivoted link members, and resilient means carried by said frame and engaging one of said pivoted link members whereby to urge said movable jaw member downwardly.

5. A dead fall trap of the character described comprising a base, a frame mounted on said base, said frame comprising upper and lower parallel members and arcuately inclined end portions, a movable jaw member slidably engaging said arcuately inclined end members, link means swingingly carried by said frame and engaging said movable jaw member whereby to maintain said movable jaw member in substantially parallel relation to said upper and lower frame members, a shaft outstanding from said upper frame member, spring means carried by said shaft and engaging said link means whereby to urge said movable jaw downwardly, trigger means swingingly mounted on said frame, and connecting means connecting said trigger means and said link means whereby to hold said movable jaw in open position.

In testimony whereof I hereunto affix my signature.

LEONIDAS H. MYERS.